United States Patent
Feimer

(10) Patent No.: US 7,608,182 B2
(45) Date of Patent: Oct. 27, 2009

(54) METHOD FOR REDUCING THE AMOUNT OF SULFUR PICK-UP BY HYDROCARBON STREAMS TRANSPORTED THROUGH A PIPELINE

(75) Inventor: Joseph L. Feimer, Bright's Grove (CA)

(73) Assignee: ExxonMobil Research and Engineering Company, Annandale, NJ (US)

( * ) Notice: Subject to any disclaimer, the term of this patent is extended or adjusted under 35 U.S.C. 154(b) by 38 days.

(21) Appl. No.: 11/274,594

(22) Filed: Nov. 15, 2005

(65) Prior Publication Data

US 2006/0118468 A1    Jun. 8, 2006

Related U.S. Application Data

(60) Provisional application No. 60/633,895, filed on Dec. 7, 2004.

(51) Int. Cl.
*C10G 31/00* (2006.01)
*C10G 17/02* (2006.01)

(52) U.S. Cl. ............................ 208/370; 208/219
(58) Field of Classification Search ............. 134/22.14; 208/47, 48 R, 208 R, 219, 236, 237, 238, 208/239, 240, 370; 507/90
See application file for complete search history.

(56) References Cited

U.S. PATENT DOCUMENTS 4,011,882 A * 3/1977 Nivens et al. ............... 208/236

* cited by examiner

*Primary Examiner*—Glenn Caldarola
*Assistant Examiner*—Randy Boyer

(57) ABSTRACT

A process for reducing the level of elemental sulfur and organic sulfur pick-up by refined hydrocarbon streams such as gasoline, diesel, jet fuel, kerosene or fuel additives such as ethers or iso-octane that are transported through a pipeline used to transport various sulfur-containing petroleum streams. The oxygen level in the hydrocarbon stream of interest to be pipelined as well as in at least the first hydrocarbon stream sequenced immediately ahead of the hydrocarbon stream of interest is reduced.

19 Claims, No Drawings

METHOD FOR REDUCING THE AMOUNT OF SULFUR PICK-UP BY HYDROCARBON STREAMS TRANSPORTED THROUGH A PIPELINE

CROSS-REFERENCE TO RELATED APPLICATION

This application claims benefit of U.S. Provisional Patent Application Ser. No. 60/633,895 filed Dec. 7, 2004 now abandoned.

FIELD OF THE INVENTION

This invention relates to a process for reducing the level of elemental sulfur and organic sulfur pick-up by refined hydrocarbon streams such as gasoline, diesel, jet fuel, kerosene or fuel additives such as ethers or iso-octane that are transported through a pipeline used to transport various sulfur-containing petroleum streams. The interior wall of the pipeline is pretreated with a hydrocarbon fluid containing an effective amount of a lubricity agent, such as a carboxylic acid or carboxylic acid derivative containing an amine, alkanol amide, alcohol, polyol or sulphonate, and mixtures thereof.

BACKGROUND OF THE INVENTION

It is well known that elemental sulfur in hydrocarbon streams, such as petroleum streams, is corrosive and damaging to metal equipment, particularly to copper and copper alloys. Sulfur and sulfur compounds may be present in varying concentrations in refined petroleum streams, such as in gasoline and distillate boiling range streams. Additional contamination will typically take place as a consequence of transporting the refined stream through pipelines that contain sulfur contaminants remaining in the pipeline from the transportation of sour hydrocarbon streams, such as petroleum crudes. The sulfur has a particularly corrosive effect on equipment, such as brass valves, gauges and in-tank fuel pump copper commutators.

The total sulfur in gasoline after 2005 will be limited to less than 30 wppm, while the total sulfur in diesel after 2006 will be limited to a maximum of 15 wppm. Elemental and organic sulfur contaminants that are picked up in the pipeline by gasoline and diesel products will adversely affect their ability to meet the ultra low sulfur specifications. Organic sulfur pick-up is any non-elemental sulfur component in the hydrocarbon stream that was not present in the hydrocarbon product stream prior to injecting it into the pipeline.

Various techniques have been reported for removing elemental sulfur from petroleum products. For example, U.S. Pat. No. 4,149,966 discloses a method for removing elemental sulfur from refined hydrocarbon fuels by adding an organo-mercaptan compound plus a copper compound capable of forming a soluble complex with the mercaptan and sulfur and contacting the fuel with an adsorbent material to remove the resulting copper complex and substantially all elemental sulfur.

U.S. Pat. No. 4,011,882 discloses a method for reducing sulfur contamination of refined hydrocarbon fluids transported in a pipeline for the transportation of sweet and sour hydrocarbon fluids by washing the pipeline with a wash solution containing a mixture of light and heavy amines, a corrosion inhibitor, a surfactant and an alkanol containing from 1 to 6 carbon atoms.

U.S. Pat. No. 5,618,408 teaches a method for reducing the amount of sulfur and other sulfur contaminants picked up by refined hydrocarbon products, such as gasoline and distillate fuels, which are pipelined in a pipeline used to transport heavier sour hydrocarbon streams. The method involves controlling the level of dissolved oxygen in the refined hydrocarbon stream that is to be pipelined.

The removal of elemental sulfur from pipelined fuels is also addressed in U.S. Pat. No. 5,250,181, which teaches the use of an aqueous solution containing a caustic, an aliphatic mercaptan, and optionally a sulfide to produce an aqueous layer containing metal polysulfides and a clear fluid layer having a reduced elemental sulfur level. Further, U.S. Pat. No. 5,199,978 teaches the use of an inorganic caustic material, an alkyl alcohol, and an organo mercaptan, or sulfide compound, capable of reacting with sulfur to form a fluid-insoluble polysulfide salt reaction product at ambient temperatures.

While such methods have varying degrees of success, there still exists a need in the art for reducing elemental and organic sulfur pick-up by hydrocarbon products when transported in pipelines. Reducing the elemental and organic sulfur pick-up by hydrocarbon products can either eliminate the processing requirements after the pipeline or reduce the operating cost of these processes.

SUMMARY OF THE INVENTION

In an embodiment, there is provided a process for reducing the level of sulfur pick-up in a hydrocarbon stream of interest being transported in a pipeline that is used to transport various sulfur-containing petroleum streams, which process comprises pretreating the inner wall of the pipeline with a hydrocarbon fluid containing an effective amount of a lubricity agent selected from the group consisting of carboxylic acids and carboxylic acid derivatives containing one or more groups selected from the group consisting of amine, alkanol amide, alcohol, polyol, and sulphonate.

In another embodiment, the carboxylic acid is a fatty acid or a fatty acid derivative containing a group selected from the group consisting of amine, an alkanolamide, or esters of fatty acids containing an alcohol or polyol group.

In yet another embodiment, the hydrocarbon fluid is a distillate stream.

In still another embodiment, the effective amount of lubricity agent is from about 100 wppm to about 10,000 wppm lubricity agent in hydrocarbon fluid.

DETAILED DESCRIPTION OF THE INVENTION

Pipelines that are treated in accordance with the present invention are those that are used to transport a variety of sulfur-containing petroleum and chemical streams. Such pipelines are often used to transport crudes and other heavy petroleum feedstreams containing relatively large amounts of sulfur moieties that can contaminate the inner walls of the pipeline. Lower sulfur level streams such as gasolines and diesels will have a tendency to pick up undesirable amounts of sulfur from the sulfur-contaminated walls of the pipeline unless the walls of pipeline are protected to prevent sulfur moieties from adhering to the inner walls of the pipeline.

The inner walls of the pipeline are pretreated in accordance with the present invention with a hydrocarbon fluid containing low levels of sulfur and also containing an effective amount of at least one lubricity agent. The hydrocarbon fluid is preferably one that is to be normally transported through the pipeline. Preferred hydrocarbon fluids to be used as a carrier to deliver the lubricity agent are gasoline and diesel fuels containing less than about 50 wppm sulfur, preferably less than about 30 wppm sulfur. Most preferred are diesel fuels since the lubricity agent will be more compatible with such fuels and there will be no need to separate the lubricity agent from the diesel fuel after it reaches its destination point in the pipeline.

The lubricity agent used in the practice of the present invention is selected from those that when applied to the inner wall of the pipeline will result in a wear-scar diameter, as measured by the HFRR test (ASTM D6079) of less than about 500 µm in a low sulfur diesel fuel. It is preferred that the lubricity agent be selected from carboxylic acids and carboxylic acid derivatives containing one or more chemical groups selected from the group consisting of amine, alkanol amine, alcohol, polyol, and sulphonate. It is more preferred that the carboxylic acid be a fatty acid or a fatty acid derivative containing one or more groups selected from amine, alkanolamine, and esters of fatty acids containing an alcohol or polyol group.

Non-limiting examples of carboxylic acids that can be used in the practice of the present invention include fatty acids with carbon numbers ranging from about $C_{14}$ to about $C_{40}$, preferably from about $C_{16}$ to about $C_{30}$, and more preferably from about $C_{16}$ to about $C_{20}$. Non-limiting examples of the more preferred fatty acids are oleic acid, linoleic acid, and a mixture thereof. Also, preferred are unsaturated oleic acid linoleic acid, and more preferred are amine derivatives of unsaturated oleic and linoleic acid or combinations thereof.

It is within the scope of this invention that more that one lubricity agent be used. The total amount of lubricity agent used in the hydrocarbon fluid used as a carrier to treat the inner wall of the pipeline will be an effective amount. By "effective amount" we mean that minimum amount needed to form a protective coating on the inner wall of the pipeline to prevent sulfur moieties from adhering thereto. This effective amount will vary depending on whether the pipeline is a virgin pipeline or whether it is a pipeline that was already on stream. A virgin pipeline is expected to require more lubricity agent than a previously treated pipeline that merely needs a maintenance dose. The amount of lubricity agent needed for a virgin pipeline will typically be from about 100 wppm to about 10,000 wppm, preferably from about 1000 wppm to about 10,000 wppm in hydrocarbon fluid. The amount of lubricity agent needed to treat a previously-treated pipeline will typically be from about 10 wppm to about 1000 wppm, preferably from about 50 wppm to about 500 wppm.

While it is preferred to use diesel fuels as the hydrocarbon carrier for the lubricity agent, other hydrocarbon streams can also be used. Non-limiting examples of such other hydrocarbon streams that can be used include gasoline, diesel fuel, kerosene and dialkyl ethers. Alkyl ethers and iso-octane are typically used to improve the octane rating of gasoline. These ethers are typically dialkyl ethers having about 1 to 7 carbon atoms in each alkyl group. Illustrative ethers are methyl tertiary-butyl ether, methyl tertiary-amyl ether, methyl tertiary-hexyl ether, ethyl tertiary-butyl ether, n-propyl tertiary-butyl ether, and isopropyl tertiary-amyl ether. Mixtures of these ethers and hydrocarbon streams may also be treated in accordance with this invention. Preferred are refined hydrocarbon streams, particularly those wherein the elemental and organic sulfur pick-up is detrimental to the performance of the intended use of the hydrocarbon stream. Diesel streams are preferred since the lubricity agent in more compatible with such streams and will not have to be removed after transporting the stream through the pipeline. It is within the scope of this invention that a small maintenance dose of lubricity agent can be added to all hydrocarbon streams transported through the pipeline, preferably all distillate streams.

The following examples are illustrative of the invention and are not to be taken as limiting in any way.

EXAMPLES

Example 1

A 5% $H_2S$ in $N_2$ mixture was bubbled through two liters of crude at about 4 $ft^3$/hr for approximately 0.5 hrs in order to replace any $H_2S$ that may have evolved from the original crude sample. The $H_2S$/crude mixture was then recycled overnight at about 10 cc/min and at about 20° C. through a 0.75" OD×18" long column of iron filings (about 40 mesh) to simulate the crude cycle in a pipeline. After crude recirculation the column was subjected to a series of refined products to simulate the product cycle in a pipeline. All products were pre-purged with an $O_2/N_2$ mixture (10%/90%) to simulate typical oxygen levels found in refined products stored in tankage. The products were pumped through the column of iron filings on a once-through basis at about 20 cc/min. The following product cycle was tested: 1) 740 cc of low sulfur gasoline initially containing about 1.7 mg/l total sulfur and about 0 mg/l of S°, and 2) 740 cc of ultra low sulfur diesel (ULSD) initially containing 0.5 mg/l total sulfur and 0 mg/l of S°. Following the product cycle, the column of iron filings was flushed with about 300 cc of sulfur-free toluene (air-purged) to remove residual sulfur compounds from the iron filings. The total sulfur content in the products exiting the column was determined by ASTM D5453. The S° content in the products exiting the column was determined by HPLC. The total sulfur pick-up by the products was determined by the subtracting the total sulfur content in the products exiting the column minus the original total sulfur content. The S° pick-up was determined in a similar fashion. The organic sulfur pick-up by the products was determined by subtracting the total sulfur pick-up minus the S° pick-up.

Example 2

The column of iron filings in Example 1 was pretreated at about 20 cc/min and at about 20° C. with 750 cc of ultra low sulfur diesel containing 200 wppm lubricity additive (Tolad 9125). A 5% $H_2S$ in $N_2$ mixture was bubbled through two liters of crude at about 4 $ft^3$/hr for approximately 0.5 hrs in order to replace any $H_2S$ that may have evolved from the original crude sample. The $H_2S$/crude mixture was then recycled overnight at about 10 cc/min through the column of iron filings to simulate the crude cycle in a pipeline. After crude recirculation, the column was subjected to a series of refined products to simulate the product cycle in a pipeline. All products were pre-purged with an $O_2/N_2$ mixture (10%/90%) to simulate typical oxygen levels found in refined products stored in tankage. The ultra low sulfur diesel also contained about 200 wppm of Tolad 9125 lubricity additive. The products were pumped through the column of iron filings on a once-through basis at about 20 cc/min and at about 20° C. The following product cycle was tested: 1) 740 cc of low sulfur gasoline initially containing about 1.7 mg/l total sulfur and about 0 mg/l of S°, and 2) 740 cc of ULSD initially containing about 0.5 mg/l total sulfur and about 0 mg/l of S°. Following the product cycle, the column of iron filings was flushed with about 300 cc of sulfur-free toluene (air-purged) to remove residual sulfur compounds from the iron filings. The total sulfur content in the products exiting the column was determined by ASTM D5453. The S° content in the products exiting the column was determined by HPLC. The total sulfur pick-up by the products was determined by the subtracting the total sulfur content in the products exiting the column minus the original total sulfur content. The S° pick-up was determined in a similar fashion. The organic sulfur pick-up by the products was determined by subtracting the total sulfur pick-up minus the S° pick-up.

Table 1 compares the sulfur pick-ups observed with and without pre-treating the column of iron filings with Tolad 9125 lubricity additive. As shown in Table 1, pre-treating the column with lubricity additive significantly reduces the sulfur pick-up observed in all of the products.

TABLE 1

Effect of Tolad 9125 Lubricity Additive on Sulfur Pick-up

|  | Example 1 | Example 2 |
|---|---|---|
| Pre-treatment | None | Tolad 9125 Lubricity Additive |
| Gasoline Sulfur Pick-up |  |  |
| Total Sulfur Pick-up, wppm | 40 | 6 |
| S° Pick-up, wppm | 15 | 1 |
| Organic Sulfur Pick-up, wppm | 25 | 5 |
| ULSD Sulfur Pick-up |  |  |
| Total Sulfur Pick-up, wppm | 20 | 2 |
| S° Pick-up, wppm | 10 | 0 |
| Organic Sulfur Pick-up, wppm | 10 | 2 |

Example 3

A 5% $H_2S$ in $N_2$ mixture was bubbled through two liters of crude at about 4 ft$^3$/hr for approximately 0.5 hrs in order to replace any $H_2S$ that may have evolved from the original crude sample. The $H_2S$/crude mixture was then recycled overnight at about 10 cc/min and at about 20° C. through a new 0.75" OD×18" long column of iron filings (about 40 mesh) to simulate the crude cycle in a pipeline. After crude recirculation the column was subjected to a series of refined products to simulate the product cycle in a pipeline. All products were pre-purged with a $O_2/N_2$ mixture (10%/90%) to simulate typical oxygen levels found in refined products stored in tankage. The products were pumped through the column of iron filings on a once-through basis at about 20 cc/min. The following product cycle was tested: 1) 740 cc of low sulfur gasoline initially containing about 1.7 mg/l total sulfur and about 0 mg/l of S°, and 2) 740 cc of ultra low sulfur diesel (ULSD) initially containing about 0.5 mg/l total sulfur and about 0 mg/l of S°. Following the product cycle the column of iron filings was flushed with about 300 cc of sulfur-free toluene (air-purged) to remove residual sulfur compounds from the iron filings. The total sulfur content in the products exiting the column was determined by ASTM D5453. The S° content in the products exiting the column was determined by HPLC. The total sulfur pick-up by the products was determined by the subtracting the total sulfur content in the products exiting the column minus the original total sulfur content. The S° pick-up was determined in a similar fashion. The organic sulfur pick-up by the products was determined by subtracting the total sulfur pick-up minus the S° pick-up.

Example 4

The column of iron filings in Example 3 was pretreated at about 20 cc/min at about 20° C. with about 750 cc of ultra low sulfur diesel containing about 200 wppm lubricity additive (Lubrizol 539S). A 5% $H_2S$ in $N_2$ mixture was bubbled through two liters of crude at about 4 ft$^3$/hr for approximately 0.5 hrs in order to replace any $H_2S$ that may have evolved from the original crude sample. The $H_2S$/crude mixture was then recycled overnight at about 10 cc/min through the column of iron filings to simulate the crude cycle in a pipeline. After crude recirculation the column was subjected to a series of refined products to simulate the product cycle in a pipeline. All products were pre-purged with an $O_2/N_2$ mixture (110%/90%) to simulate typical oxygen levels found in refined products stored in tankage. The ultra low sulfur diesel also contained about 200 wppm of Lubrizol 539S lubricity additive. The products were pumped through the column of iron filings on a once-through basis at about 20 cc/min and at about 20° C. The following product cycle was tested: 1) 740 cc of low sulfur gasoline initially containing about 1.7 mg/l total sulfur and about 0 mg/l of S°, and 2) 740 cc of ULSD initially containing about 0.5 mg/l total sulfur and about 0 mg/l of S°. Following the product cycle, the column of iron filings was flushed with about 300 cc of sulfur-free toluene (air-purged) to remove residual sulfur compounds from the iron filings. The total sulfur content in the products exiting the column was determined by ASTM D5453. The S° content in the products exiting the column was determined by HPLC. The total sulfur pick-up by the products was determined by the subtracting the total sulfur content in the products exiting the column minus the original total sulfur content. The S° pick-up was determined in a similar fashion. The organic sulfur pick-up by the products was determined by subtracting the total sulfur pick-up minus the S° pick-up.

Table 2 compares the sulfur pick-ups observed with and without pre-treating the column of iron filings with Lubrizol 539S lubricity additive. As shown in Table 2, pre-treating the column with lubricity additive significantly reduces the sulfur pick-up observed in all of the products.

TABLE 2

Effect of Lubrizol 539S Lubricity Additive on Sulfur Pick-up

|  | Example 1 | Example 2 |
|---|---|---|
| Pre-treatment | None | Lubrizol 539S Lubricity Additive |
| Gasoline Sulfur Pick-up |  |  |
| Total Sulfur Pick-up, wppm | 29 | 10 |
| S° Pick-up, wppm | 13 | 5 |
| Organic Sulfur Pick-up, wppm | 15 | 5 |
| ULSD Sulfur Pick-up |  |  |
| Total Sulfur Pick-up, wppm | 7 | 2 |
| S° Pick-up, wppm | 3 | 1 |
| Organic Sulfur Pick-up, wppm | 3 | 1 |

The High Frequency Reciprocating Rig test (HFRR) is commonly used in the industry to determine the effectiveness of a lubricity additive. The HFRR test continuously strokes a steel ball over a flat steel surface in a reciprocating fashion for a period of about 75 minutes. A microscope is used to measure the wear scar on the steel ball after completing the HFRR test. Details of the HFRR test can be found in ASTM D6079. Lubricity additives are required for low sulfur diesels since these products do not contain the sulfur species that provide natural lubricity. Typically, low sulfur diesels without any additive yield wear scars in the HFRR test of greater than about 550 microns while lubricity additives such as Tolad 9125 and Lubrizol 539S reduce the wear scar to less than about 500 microns at a typical dosage rate of about 85 wppm.

The active ingredient in the Tolad 9125 is a fatty acid and an amine derivative, while the active ingredient Lubrizol 539S is a carboxylic acid. Oleic and linoleic acids are typically examples of fatty acids and carboxylic acids while alkanolamines are typically examples of amine derivatives.

The invention claimed is:

1. A process for reducing the level of sulfur pick-up in a hydrocarbon stream of interest being transported in a pipeline that is used to transport various sulfur-containing petroleum streams, which process comprises pretreating the inner wall of the pipeline with a hydrocarbon fluid containing an effective amount of a lubricity agent selected from carboxylic acids and carboxylic acid derivatives having from about 14 to about 40 carbon atoms and containing one or more alcohol groups,
wherein the hydrocarbon fluid is selected from distillate boiling range streams and naphtha boiling range streams containing less than about 50 wppm sulfur.

2. The process of claim 1, wherein the hydrocarbon fluid is distillate boiling range stream.

3. The process of claim 1 wherein the amount of lubricity agent used is from about 10 wppm to about 10,000 wppm in hydrocarbon fluid.

4. The process of claim 3 wherein the pipeline is a virgin pipeline.

5. The process of claim 4 wherein the amount of lubricity agent used is from about 1,000 wppm to about 10,000 wppm.

6. The process of clam 3 wherein the amount of lubricity agent used is from about 10 to about 1,000 wppm.

7. The process of claim 1 wherein the lubricity agent is a fatty acid or a fatty acid derivative containing an alcohol or polyol group.

8. The process of claim 7 wherein the fatty acid is selected from oleic acid and linoleic acid.

9. The process of claim 1, wherein the number of carbons is from about 16 to about 30.

10. A process for reducing the level of sulfur pick-up in a hydrocarbon stream of interest being transported in a pipeline that is used to transport various sulfur-containing petroleum streams, which process comprises pretreating the inner wall of the pipeline with a diesel fuel containing an effective amount of a lubricity agent selected from carboxylic acids and carbosylic acid derivatives having from about 14 to about 40 carbon atoms and containing one or more alcohol groups,
wherein said effective amount is one that will result in a wear scar diameter of the inner wall of said pipeline, as measured by the HFRR test (ASTM D6079), of less than about 500 μm in a low sulfur diesel.

11. The process of claim 10 wherein the diesel fuel contains less than about 50 wppm sulfur.

12. The process of claim 10 wherein the amount of lubricity agent used is from about 10 wppm to about 10,000 wppm in hydrocarbon fluid.

13. The process of claim 12 wherein the pipeline is a virgin pipeline.

14. The process of claim 13 wherein the amount of lubricity agent used is from about 1,000 wppm to about 10,000 wppm.

15. The process of clam 12 wherein the amount of lubricity agent used is from about 10 to about 1,000 wppm.

16. The process of claim 10 wherein the lubricity agent is a fatty acid or a fatty acid derivative containing an alcohol or polyol group.

17. The process of claim 16 wherein the fatty acid is selected from oleic acid and linolcic acid.

18. The process of claim 10 wherein the number of carbons is from about 16 to about 30.

19. A process for reducing the level of sulfur pick-up in a hydrocarbon stream of interest being transported in a virgin pipeline that is used to transport various sulfur-containing petroleum streams, which process comprises pretreating the inner wall of the pipeline with a hydrocarbon fluid containing an effective amount of a carboxylic acid as a lubricity agent the effective amount of lubricity agent comprising from about 1,000 to about 10,000 wppm of lubricity agent.

\* \* \* \* \*